United States Patent
Wessel et al.

(10) Patent No.: US 10,395,680 B1
(45) Date of Patent: *Aug. 27, 2019

(54) LEADING EDGE THERMAL SENSOR FOR A HEAT-ASSISTED MAGNETIC RECORDING HEAD

(71) Applicant: Seagate Technology LLC, Cupertino, CA (US)

(72) Inventors: James Gary Wessel, Savage, MN (US); Chen Wang, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/956,044

(22) Filed: Apr. 18, 2018

(51) Int. Cl.
*G11B 11/105* (2006.01)
*G11B 5/48* (2006.01)
*G11B 7/1263* (2012.01)
*G11B 5/60* (2006.01)
*G11B 5/012* (2006.01)
*G11B 5/40* (2006.01)
*G11B 5/02* (2006.01)
*G11B 5/00* (2006.01)

(52) U.S. Cl.
CPC ............ *G11B 5/4866* (2013.01); *G11B 5/012* (2013.01); *G11B 5/02* (2013.01); *G11B 5/40* (2013.01); *G11B 5/6088* (2013.01); *G11B 7/1263* (2013.01); *G11B 2005/0021* (2013.01)

(58) Field of Classification Search
None
See application file for complete search history.

(56) References Cited

U.S. PATENT DOCUMENTS

| | | |
|---|---|---|
| 7,095,577 B1 | 8/2006 | Codilian et al. |
| 7,928,386 B2 | 4/2011 | Frey et al. |
| 8,705,323 B2 | 4/2014 | Contreras et al. |
| 8,810,947 B1 | 8/2014 | Ren et al. |
| 8,811,127 B1 | 8/2014 | Hirata et al. |
| 8,824,085 B2 | 9/2014 | Wilson et al. |
| 8,842,507 B1 | 9/2014 | Hirano et al. |
| 8,879,189 B2 | 11/2014 | Miyamoto et al. |
| 8,908,483 B1 | 12/2014 | Ren et al. |
| 9,030,773 B2 | 5/2015 | MacKen et al. |
| 9,042,207 B2 | 5/2015 | Dakroub |
| 9,042,210 B2 | 5/2015 | Macken |
| 9,047,926 B2 | 6/2015 | Contreras et al. |

(Continued)

OTHER PUBLICATIONS

File History for U.S. Appl. No. 15/342,326.
File History for U.S. Appl. No. 15/657,746.
File History for U.S. Appl. No. 16/134,021.

*Primary Examiner* — Tan X Dinh
(74) *Attorney, Agent, or Firm* — Hollingsworth Davis, LLC

(57) ABSTRACT

An apparatus includes a slider having an air bearing surface (ABS). A near-field transducer (NFT) is disposed at or near the ABS. The slider has an optical waveguide configured to couple light from a laser source to the NFT. A thermal sensor is disposed at a leading edge of the NFT, the thermal sensor has an ABS section situated at or proximate the ABS and a distal section extending away from the ABS. The thermal sensor is configured to detect changes in output optical power of the laser source and contact between the slider and a magnetic recording medium.

20 Claims, 10 Drawing Sheets

(56) References Cited

U.S. PATENT DOCUMENTS

| | | |
|---|---|---|
| 9,153,272 B1 | 10/2015 | Rausch et al. |
| 9,177,577 B2 | 11/2015 | Macken et al. |
| 9,202,499 B2 | 12/2015 | Kiely et al. |
| 9,202,500 B2 | 12/2015 | Kunkel et al. |
| 9,214,173 B2 | 12/2015 | Kunkel et al. |
| 9,236,081 B1 | 1/2016 | Chu et al. |
| 9,502,061 B1 | 11/2016 | Zhu et al. |
| 9,536,555 B1 | 1/2017 | Duda et al. |
| 9,558,774 B1 | 1/2017 | Macken |
| 9,595,288 B1 * | 3/2017 | Chu ................ G11B 7/1267 |
| 9,601,140 B1 | 3/2017 | Rajauria |
| 9,620,163 B1 * | 4/2017 | Zheng ................ G11B 5/012 |
| 9,685,182 B1 | 6/2017 | Granz et al. |
| 9,704,529 B1 | 7/2017 | Lou et al. |
| 9,741,375 B2 | 8/2017 | Kunkel et al. |
| 9,747,937 B1 | 8/2017 | Duda et al. |
| 9,799,358 B2 | 10/2017 | Kiely et al. |
| 9,799,361 B1 * | 10/2017 | Duda ................ G11B 5/6076 |
| 9,824,705 B1 | 11/2017 | Macken et al. |
| 9,858,953 B1 | 1/2018 | Johnson |
| 9,875,765 B2 | 1/2018 | Riddering |
| 9,875,767 B2 | 1/2018 | Duda et al. |
| 9,881,642 B2 | 1/2018 | Zhang et al. |
| 9,916,847 B1 | 3/2018 | Granz et al. |
| 9,916,851 B1 | 3/2018 | Seigler et al. |
| 9,928,873 B1 | 3/2018 | Liu et al. |
| 9,959,893 B1 | 5/2018 | Duda et al. |
| 9,972,350 B1 * | 5/2018 | Macken ................ G11B 5/6005 |
| 10,056,101 B1 * | 8/2018 | Wessel ................ G11B 5/6076 |
| 10,147,454 B1 | 12/2018 | Mendonsa et al. |
| 2011/0299367 A1 | 12/2011 | Naniwa et al. |
| 2012/0051196 A1 | 3/2012 | Grobis et al. |
| 2013/0077453 A1 | 3/2013 | Alex |
| 2013/0286511 A1 | 10/2013 | Erden et al. |
| 2013/0286802 A1 | 10/2013 | Kiely |
| 2014/0119164 A1 | 5/2014 | Wilson et al. |
| 2014/0269238 A1 | 9/2014 | Kautzky et al. |
| 2015/0003222 A1 | 1/2015 | Dakroub et al. |
| 2015/0036469 A1 * | 2/2015 | Johnson ................ G11B 13/08 369/13.33 |
| 2015/0162022 A1 | 6/2015 | Peng et al. |
| 2015/0279430 A1 | 10/2015 | Trantham et al. |
| 2016/0104514 A1 | 4/2016 | Burnett et al. |
| 2016/0284372 A1 | 9/2016 | Duda et al. |
| 2017/0032810 A1 | 2/2017 | Macken et al. |
| 2017/0370770 A1 * | 12/2017 | Kiely ................ G01K 7/16 |

* cited by examiner

LEADING EDGE THERMAL SENSOR FOR A HEAT-ASSISTED MAGNETIC RECORDING HEAD

SUMMARY

Embodiments described herein are directed to an apparatus comprising a slider having an air bearing surface (ABS). A near-field transducer (NFT) is disposed at or near the ABS. The slider includes an optical waveguide configured to couple light from a laser source to the NFT. A thermal sensor is disposed at a leading edge of the NFT, the thermal sensor comprising an ABS section situated at or proximate the ABS and a distal section extending away from the ABS. The thermal sensor is configured to detect changes in output optical power of the laser source and contact between the slider and a magnetic recording medium.

Embodiments are directed to an apparatus comprising a slider having an air bearing surface (ABS). The slider comprises a write pole having a write pole tip at the ABS. A near-field transducer (NFT) is disposed at or near the ABS adjacent the write pole. An optical waveguide is configured to couple light from a laser source to the NFT. A thermal sensor is disposed at a leading edge of the NFT, the thermal sensor comprising an ABS section and a distal section. The ABS section comprises a first ABS section spaced apart from a second ABS section in a cross-track direction. The distal section extends away from the ABS and is connected to the first and second ABS sections.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
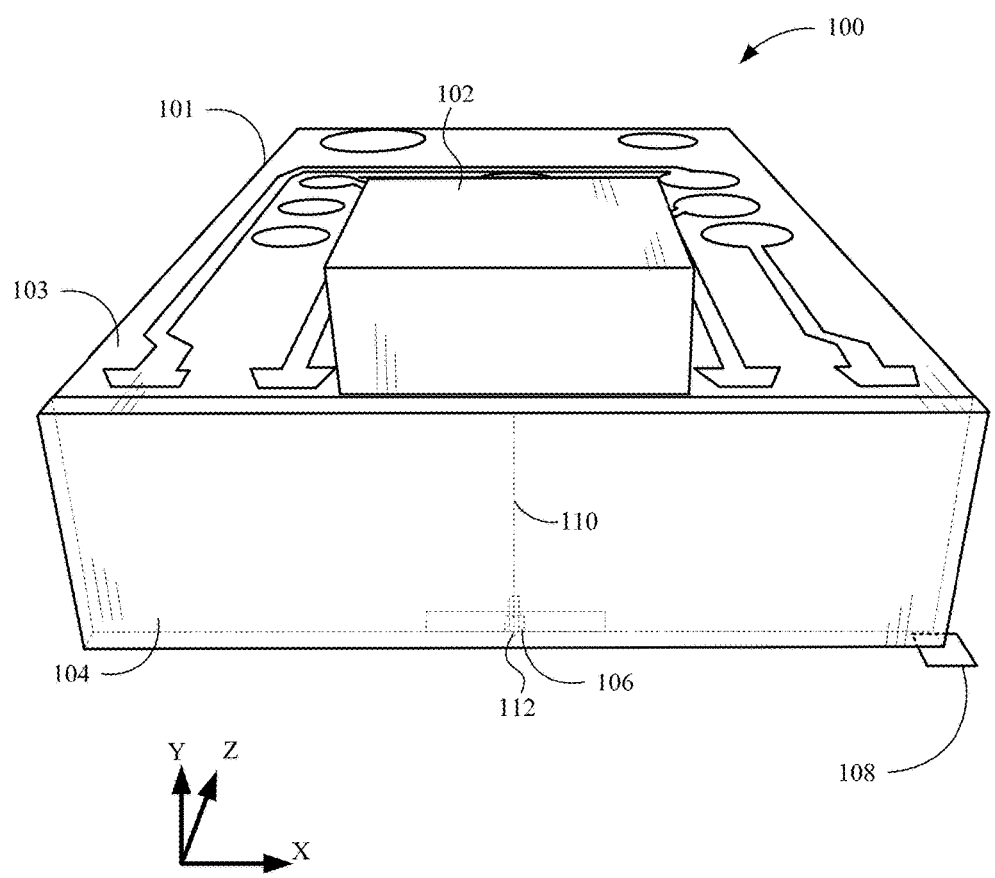
FIG. 1 shows a perspective view of a HAMR slider assembly according to embodiments described herein.

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a source of optical energy (e.g., a laser diode) is integrated with a recording head and couples optical energy to a waveguide or other light transmission path. The waveguide delivers the optical energy to a near-field transducer (NFT). The NFT concentrates the optical energy into a tiny optical spot in a recording layer of a magnetic recording medium, which raises the medium's temperature locally, reducing the writing magnetic field required for high-density recording.

A HAMR read/write element, sometimes referred to as a slider, recording head, read head, write head, read/write head, etc., includes magnetic read and write transducers similar to those on current hard drives. For example, a magnetoresistive sensor reads data by detecting magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider also includes a source of energy, such as a laser diode, to heat the media while it is being written to by the write pole. An optical delivery path, such as a waveguide, is integrated into the HAMR slider to deliver the energy to the surface of the media.

The optical delivery path of a HAMR slider may include a plasmonic transducer proximate a media-facing surface (e.g., air-bearing surface (ABS), contact surface). The plasmonic transducer shapes and transmits the energy to a small region on the medium. The plasmonic transducer is sometimes referred to as a near-field transducer, optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region reaching or exceeding the Curie temperature (TO and having dimensions less than 100 nm (e.g., ~50 nm). The heat generated during write operations can cause portions of the ABS, typically portions near the NFT and waveguide, to expand. Thermal resistive sensors can be positioned in/near this expansion area to detect whether the ABS contacts the recording media. These thermal, resistive sensors can also be used to detect and monitor the amount of power generated by the energy source (e.g., laser diode). However, at their present positions, it may be difficult for thermal sensors to generate a strong enough signal to monitor laser power. Relocating the sensors closer to the center of the waveguide can provide a higher/stronger signal, but this may be difficult to integrate into the space with other structural elements in the area. Embodiments described herein are directed to a leading edge thermal sensor configured to have a shape that allows for the possible integration of other structural elements in the area.

With reference to FIG. 1, a perspective view shows a HAMR slider assembly 100 according to a representative embodiment. The slider assembly 100 includes a laser diode 102 located on input surface 103 of a slider body 101. In this example, the input surface 103 is a top surface, which is located opposite a media-facing surface 108 that is positioned over a surface of a recording media (not shown) during device operation. The media facing surface 108 faces, and is held proximate to, the moving media surface while reading and writing to the media. The media-facing surface 108 may be configured as an air-bearing surface that maintains separation from the media surface via a thin layer of air.

The laser diode 102 delivers light to a region proximate a HAMR read/write head 106, which is located near the media-facing surface 108. The energy heats the recording media as it passes by the read/write head 106. Optical coupling components, such as a waveguide system 110, are integrally formed within the slider body 101 (e.g., near a trailing edge surface 104 of the slider) and function as an optical path that delivers energy from the laser diode 102 to the recording media via a NFT 112. The NFT 112 is proximate the writer of the read/write head 106 and causes heating of the media during recording operations.

The laser diode 102 may be configured as either an edge-emitting laser or surface-emitting laser. While the representative embodiment in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be externally mounted to the slider 100, and coupled to the slider by way of optic fiber and/or a waveguide. An input surface of the slider body 103 may include a grating or other coupling feature to receive light from the laser via the optic fiber and/or waveguide.

Figure 2:
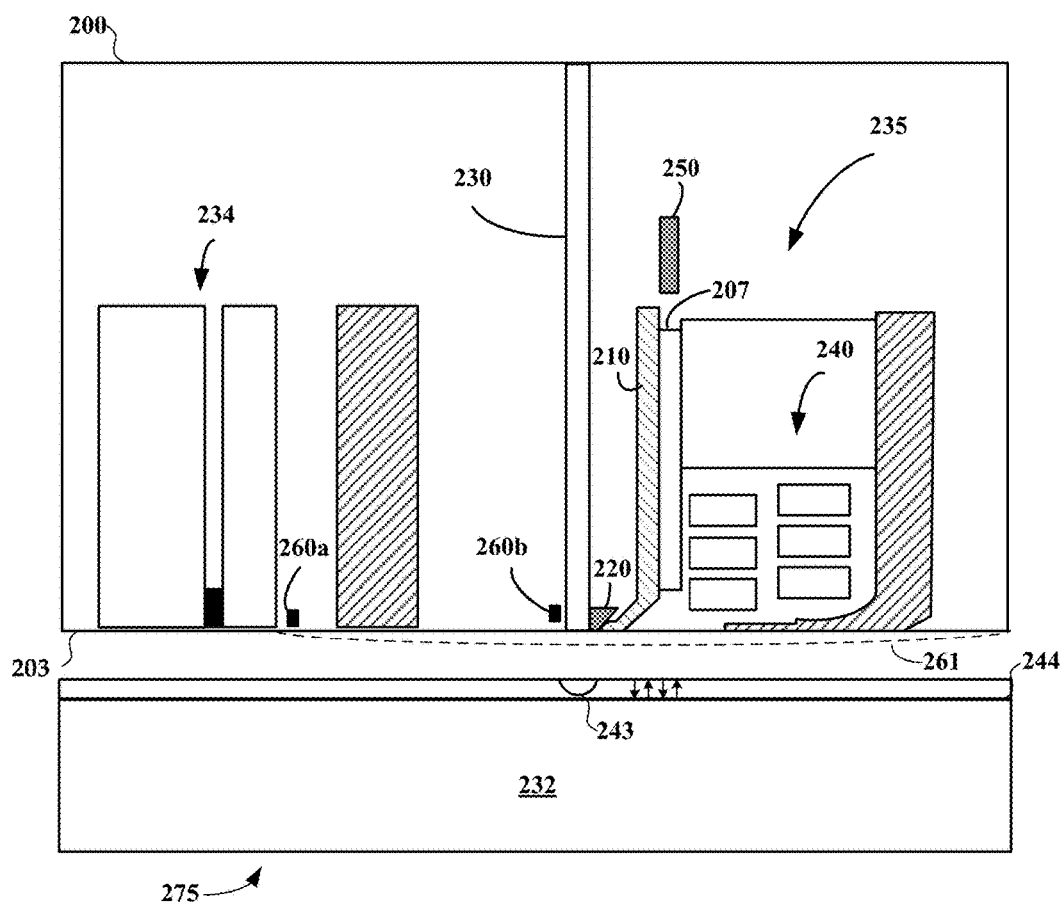
FIG. 2 illustrates a cross-sectional view of a slider in accordance with embodiments described herein.

In FIG. 2, a cross-sectional diagram shows a slider 200 according to various embodiments. The head transducer 200 is shown positioned over a writeable medium 275 (e.g., magnetic disk) and generally includes a substrate 232 on which at least a hard magnetic layer 244 is deposited or otherwise formed. An NFT 220 is located between a write pole 210 and a waveguide 230 at a media-facing surface 203. A small portion or spot 243 of the layer 244 is heated via waveguide 230 and NFT 220 to reduce the coercivity of the material enough so that the magnetic field from the magnetic write pole 210 is strong enough to change the magnetization direction of the recording layer 244. Bits of information may then be recorded in the form of a perpendicular upward/downward magnetization direction for a series of magnetic domains in the layer 244.

The portion of head transducer 200 illustrated in FIG. 2 may include a number of heat generating components at the media-facing surface 203, such as write coil 240, NFT 220, and a heater 250. A magnetic yoke 207 is disposed between the write coil 240 and the write pole 210. Due to thermal expansion of the surrounding material (e.g., dielectric material), the heat can cause a thermal protrusion at the media-facing surface 203, indicated by dashed line 261. Generally, the heater 250 is used to finely adjust head-media spacing near the protrusion to obtain a desired spacing between the media 275 and read/write transducers 234, 235.

This head-media spacing can also be referred to as the slider's fly height. It is often desirable to have a relatively small distance or spacing between a recording head transducer and its associated medium. By reducing the head-media spacing, a recording head transducer is typically better able to both write and read data to and from a medium. Reducing the head-media spacing also allows for surveying of recording medium topography, such as for detecting asperities and other features of the recording medium surface.

One or more thermal sensors, e.g., temperature coefficient of resistance (TCR) sensors or differential-ended temperature coefficient of resistance (DETCR) sensors, can be located within a protrusion region at one or more optional locations. Historically these sensors have been used during manufacturing to set head-disk spacing or to detect thermal asperities (TA) on an associated medium during a certification process. As shown in FIG. 2, optional thermal sensors 260a, 260b are located at different locations within the region of protrusion 261. In many embodiments, only one thermal sensor is used. In some embodiments a thermal sensor is located in the region of the writer 235, near the write pole 210, return pole 215, and/or the NFT 220. Thermal sensor 260b may be referred to as a leading sensor as it will pass over the media prior to the NFT and write pole. A thermal sensor, such as thermal sensor 260a, may also be located proximate the reader if used primarily for thermal asperity detection.

Thermal sensors 260a, 260b are coupled to signal processing circuitry as is known in the art. The circuitry determines temperatures at or near the media-facing surface 203, and those measured temperatures can be used for a number of purposes, such as controlling the heater 250 to adjust head-media spacing at the protrusion region 261, detecting contact with the recording medium, and/or monitoring the power of the laser diode. It has been demonstrated that for a head transducer having a thermal sensor reasonably close to the NFT 220, it is possible to measure changes in thermal conductance across the head-disc interface and to use this to monitor changes, such as those due to clearance changes or due to contamination.

Figure 3:
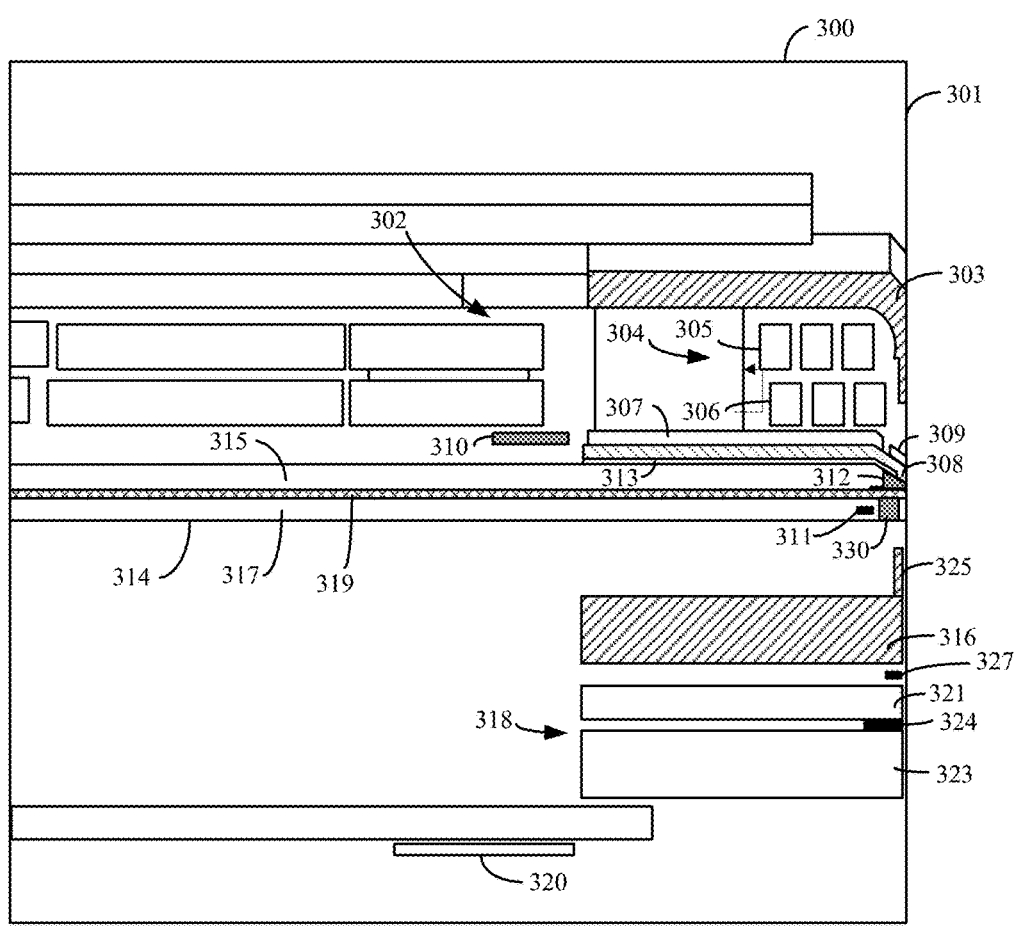
FIG. 3 shows a cross-sectional view illustrating portions of the slider body near the ABS in accordance with embodiments described herein.

In FIG. 3, a cross-sectional view illustrates portions of the slider body 300 near the media-facing ABS 301 in further detail according to various embodiments. A writer 302 includes a number of components, including a second return pole 303 proximate a write coil 304. The write coil 304 includes an upper coil 305 and a lower coil 306. The write coil 304 may conform to any writer coil design, including a double-pancake design, single-layer pancake design, or a helical coil design, for example.

The write coil 304 is configured to energize a write pole 308. A magnetic yoke 307 is disposed between the write coil 304 and the write pole 308. A write pole heat sink 309 is thermally coupled to the write pole 308. A writer heater 310 is positioned proximate the write pole 308 and is configured to thermally actuate the write pole 308 during write operations. An NFT 312 is situated proximate the write pole 308 and is optically coupled to an optical waveguide 314. The waveguide 314 includes an upper cladding layer 315, a lower cladding layer 317, and a core 319 between the upper and lower cladding layers 315, 317. A diffuser 313 thermally couples to the NFT 312 and extends between at least a portion of the write pole 308 and the upper cladding layer 315. The writer 302 also includes a leading shield 325 and a first return pole 316, which is magnetically coupled to the write pole 308 and the second return pole 303. The slider 300 also includes a reader 318. The reader 318 includes a read element 324 (e.g., a GMR sensor) disposed between a pair of reader shields 321, 323. A reader heater 320 is located proximate the reader 318, which is configured to thermally actuate the reader 318 during read operations.

A contact sensor 311 is positioned at or near the ABS 301 in the lower cladding layer 317. At this location, the contact sensor 311 is arranged to detect contact between a close point of the writer 302 (when thermally actuated by one or more heating elements) and a magnetic recording medium. The slider 300 also includes a contact sensor 327 positioned proximate the reader 318. The contact sensor 327 is configured to detect contact between a close point of the reader 318 (when thermally actuated by one or more heating elements) and the recording medium. In some embodiments, the writer contact sensor 311 is coupled (in series or in parallel) to the reader contact sensor 327. In other embodiments, the writer and reader contact sensors 311 and 327 are independent of each other.

The contact sensors 311, 327 are typically thermal sensors having a temperature coefficient of resistance (referred to herein as TCR sensors, such as a differential-ended TCR sensor or DETCR). A DETCR sensor is configured to operate with each of its two electrical contacts or leads (ends) connected to respective bias sources provided by a pair of electrical bond pads of the slider. According to various embodiments described herein, the thermal sensor may be referred to as a contact sensor, a thermal asperity sensor, a laser power monitor, and/or a DETCR. The TCR sensors 311, 327 are configured to sense changes in heat flow for detecting onset of head-medium contact. The TCR sensor 311 is also configured to sense changes in temperature due to light absorption from the waveguide core 319 for monitoring laser power.

Thermal sensor 311 is located on the leading edge, or cross-position, of the slider to pass over the media prior to the NFT and write pole. According to various embodiments, the thermal sensor 311 is recessed from the ABS. For example, the thermal sensor 311 may be recessed from the ABS in a range of about 100 nm to about 300 nm. In some cases, the thermal sensor 311 is recessed from the ABS about 200 nm. As a DETCR, the laser power monitoring signal of sensor 311 comes from the temperature change and the resulting resistance change ($\Delta V \sim \Delta R * I_{bias}$). Therefore, the change in resistance ($\Delta R$) between the laser being "on" and the laser being "off" represents the signal strength. When the laser goes from "off" to "on," three sources can lead to the change in sensor resistance: 1) heat transfer from the NFT region (the closer to the NFT, the higher the $\Delta R$), 2) light absorption (light escaping from the waveguide core), and 3) media back heating (likely an overall small effect on the $\Delta R$). However, a higher change in resistance is accompanied by higher temperatures. Therefore, a stronger signal (higher $\Delta R$) is countered with lower reliability (higher temperature) for the thermal sensor 311.

The slider 300 further includes a structural element 330 positioned adjacent the waveguide 314 and near the ABS 301. According to various embodiments, the structural element 330 is a metallic optical element. For example, the metallic optical element 530 may be configured as a bottom cladding disc (BCD) positioned adjacent to the waveguide 314 in the lower cladding layer 317. The metallic optical element 330 comprises or is covered with a plasmonic metal or alloy, which serves to enhance the plasmonic excitation of the NFT 312. The metallic optical element 330 comprises a reflective surface configured to reflect stray light in a direction of the NFT 312 and/or shape the light that is directed towards the NFT 312. The reflective surface of the metallic optical element 330 may also be configured to reduce back-reflection of light from the magnetic recording medium to the light source (e.g., to assist in laser mode hop reduction).

The metallic optical element 330 shown in FIG. 3 may be spaced away from the ABS 301 such that a gap is defined between the metallic optical element 330 and the ABS 301. The gap can be filled with a dielectric material, such as alumina. According to various embodiments, the thermal sensor 311 is heated by the metallic optical element 330 but does not negatively affect the optical function of the metallic optical element 330 or the NFT 311. While the structural element of FIG. 3 is described as being a metallic optical element, it is to be understood that the structural element may include other types of structural elements such as magnetic structures, light blockers, light reflectors, heat sinks, heaters, mechanical wear-protection structures, push blocks, and contact pads, for example.

According to various embodiments, a thermal sensor placed at a leading edge of the NFT is difficult to incorporate with a structural element because of the close proximity in a small area. A thermal sensor having a shape that a least partly surrounds the structural element may allow for the structural element and the thermal sensor to both be disposed on the leading edge of the NFT. At least one of the location and the shape of the thermal sensor may inhibit buildup that may occur between the slider and the disk.

Figure 4A:
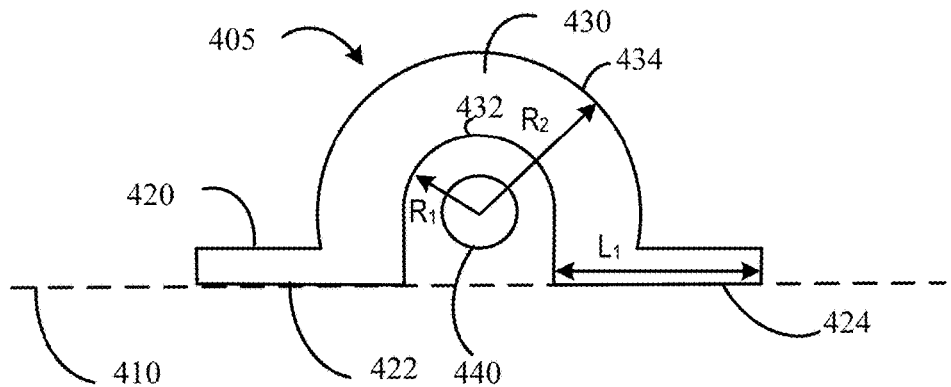
FIGS. 4A-4E illustrate embodiments having a thermal sensor comprising an ABS section situated at or proximate the ABS and a distal section extending away from the ABS in accordance with embodiments described herein.
Figure 4B:
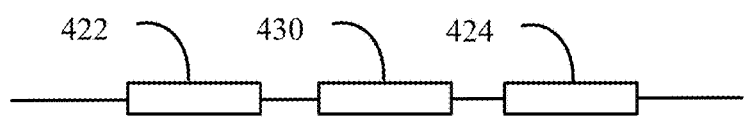

FIGS. 4A-4B illustrate embodiments in which the thermal sensor 405 comprises an ABS section 420 situated at or proximate the ABS 410 and a distal section 430 extending away from the ABS 410. In the embodiment shown in FIG. 4A, the ABS section 420 includes a first ABS section 422 and a second ABS section 424. The first ABS section 422 is spaced apart from the second ABS section 424 in a cross-track direction. The distal section 430 of the thermal sensor 405 extends into the body of the slider away from the ABS 410 to a location lateral of and behind a structural element 440. In some embodiments, the ABS section 420 and the distal section 430 of the thermal sensor 405 are situated in a plane substantially perpendicular to a plane of the ABS 410. In some cases, the distal section 430 can extend into the body of the slider along a plane oriented at an oblique angle relative to the plane of the ABS 410.

In the embodiment shown in FIG. 4A, the distal section 430 of the thermal sensor 405 at least partially surrounds the mechanical structure 440. The distal section 430 extends between the first and second ABS sections 422 and 424, and encompasses locations lateral of and behind the structural element 440. In the configuration shown in FIG. 4A, the thermal sensor 405 has a shape generally resembling the Greek symbol Omega.

The thermal sensor 405 has a first radius, $R_1$, that is represents the distance between the structural element 440 and an inner surface 432 of the thermal sensor 405. According to various embodiments, $R_1$ is in a range of about 550 nm to about 800 nm. In some cases, $R_1$ is in a range of about 625 nm to about 725 nm. The thermal sensor 405 has a second radius, $R_2$, that represents the distance between the structural element 440 and an outer surface 434 of the thermal sensor 405. According to various embodiments, $R_2$ is in a range of about 1100 nm to about 1450 nm. In some cases, $R_2$ is in a range of about 1225 nm to about 1325 nm. The first ABS section 422 and the second ABS section 424 may also have a length, $L_1$. L1 may be in a range of about 0.5 μm to about 5 μm, for example. While, the example shown in FIG. 4A shows a length of the first ABS section 422 and the second ABS section 424 as being substantially the same, it is to be understood that the length of the first ABS section 422 may be different than the length of the second ABS section 424.

Figure 4C:
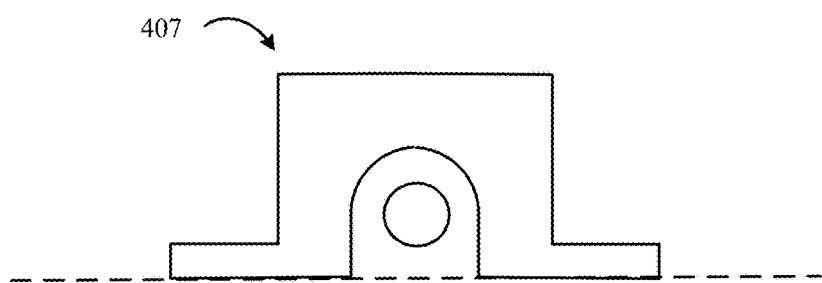
Figure 4D:
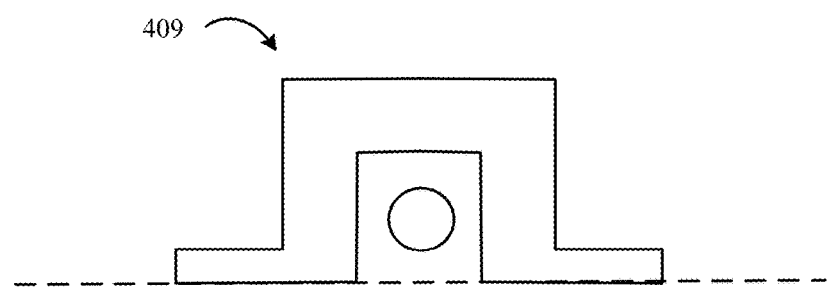
Figure 4E:
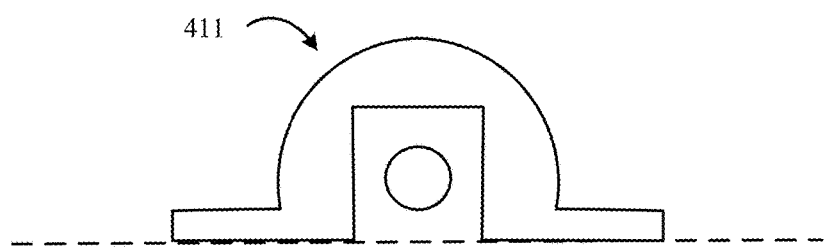

FIG. 4B illustrates a view of the thermal sensor from the ABS. As described above, the thermal sensor includes a first ABS section 422, a second ABS section 424, and a distal section 430. The first ABS section 422, the second ABS section 424 and the distal section 430 may be connected in series. According to various embodiments, the distal section 430 is configured to be a bolometer. In some cases, the distal section 430 can enhance the signal of the thermal sensor 405 by harnessing stray light and increasing the heat of the thermal sensor 405. While the distal section shown in FIG. 4A has curved edges, in some cases, the distal section 407, 409, 411 may have at least some substantially straight edges as shown in FIGS. 4C, 4D, and 4E.

Figure 5A:
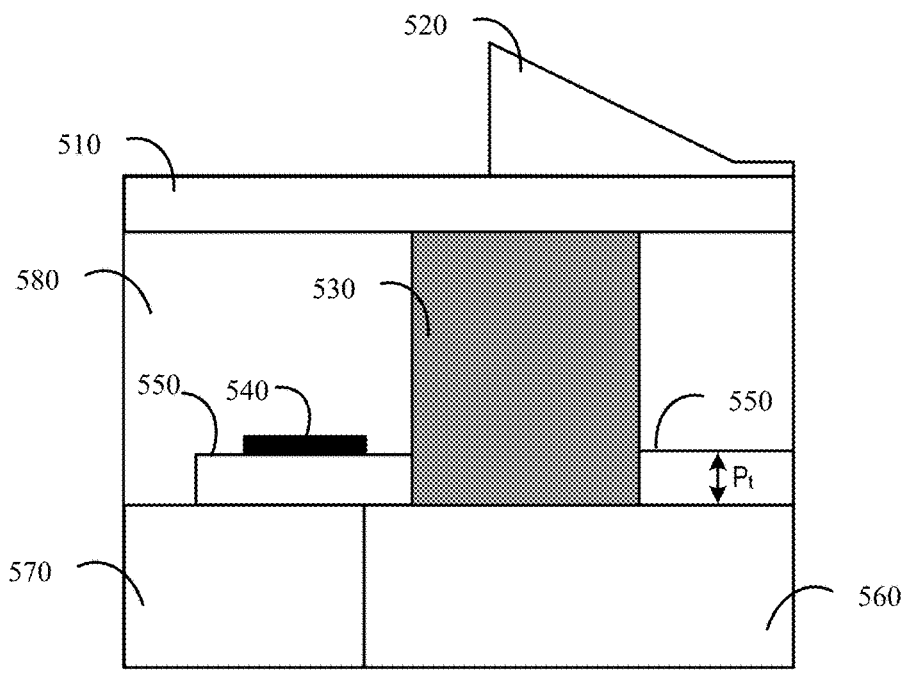
FIGS. 5A and 5B illustrate cross-sectional views of a slider incorporating a thermal sensor in accordance with embodiments described herein.
Figure 5B:
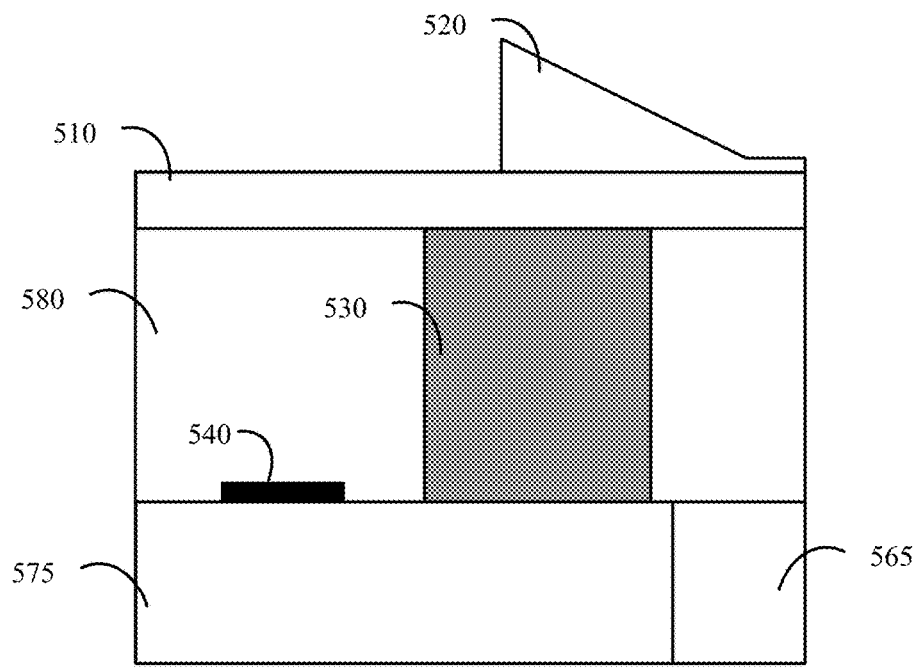

FIGS. 5A and 5B illustrate cross-sectional views of a slider incorporating a thermal sensor in accordance with embodiments described herein. An NFT 520 is disposed proximate a waveguide core 510. A metallic optical element 530 and a thermal sensor 540 are disposed at a leading edge of the NFT 520 in a lower cladding 580 of the waveguide core 510. According to various embodiments, a spacing between the waveguide core 510 and the thermal sensor 540 is in a range of about 300 nm to about 500 nm. In some cases, the thermal sensor 540 is spaced apart from the waveguide core 510 in a range of about 350 nm to about 450 nm. A leading writer shield 560, 565 and a dielectric material 570, 575 are disposed on a side of the thermal sensor 540 opposite the waveguide core 510. FIG. 5A illustrates an example in which a spacer layer, e.g., pedestal, is disposed between the thermal sensor 540 and the dielectric material 570. The spacer layer has a thickness, $P_t$, in a range of about 100 nm to about 350 nm. In some cases, the pedestal thickness is in a range of about 150 nm to about 280 nm. In some cases, the thermal sensor 540 may be disposed directly on the dielectric material 575 as shown in FIG. 5B.

Figure 6:
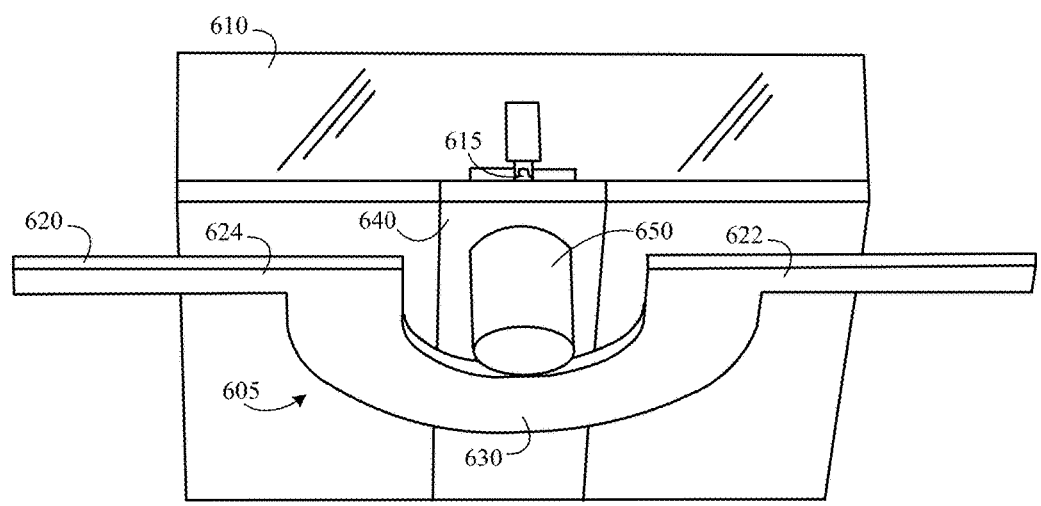
FIG. 6 illustrates a three-dimensional view of a part of a slider having a thermal sensor disposed at a leading edge of the NFT in accordance with embodiments described herein.

FIG. 6 illustrates a three-dimensional view of a part of a slider having a thermal sensor 605 disposed at a leading edge of the NFT 615 in accordance with embodiments described herein. The waveguide core 640 is disposed between the thermal sensor 605 and the NFT 615. The thermal sensor 605 comprises an ABS section 620 situated at or proximate the ABS 610 and a distal section 430 extending away from the ABS 610. The ABS section 620 includes a first ABS section 622 and a second ABS section 624. The first ABS section 622 is spaced apart from the second ABS section 624 in a cross-track direction. In embodiments having a structural element, the distal section 630 of the thermal sensor 605 extends into the body of the slider away from the ABS 610 to a location lateral of and behind a structural element 650. In some embodiments, the ABS section 620 and the distal section 630 of the thermal sensor 605 are situated in a plane substantially perpendicular to a plane of the ABS 610.

Figure 7A:
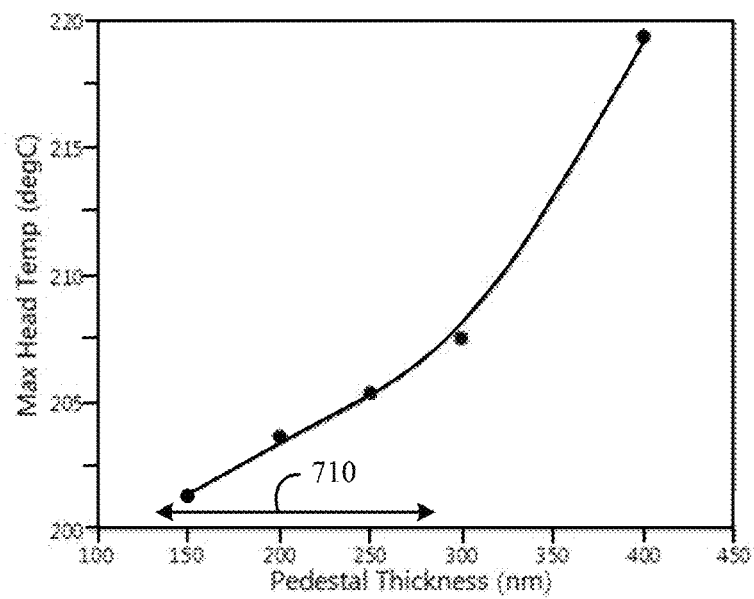
FIGS. 7A-7D illustrate various performance data associated with the thermal sensor configurations described herein.
Figure 7B:
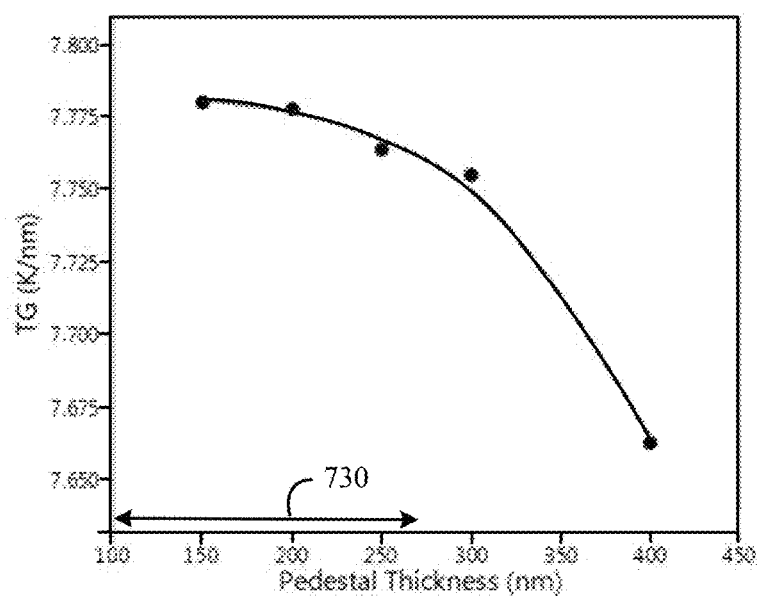
Figure 7C:
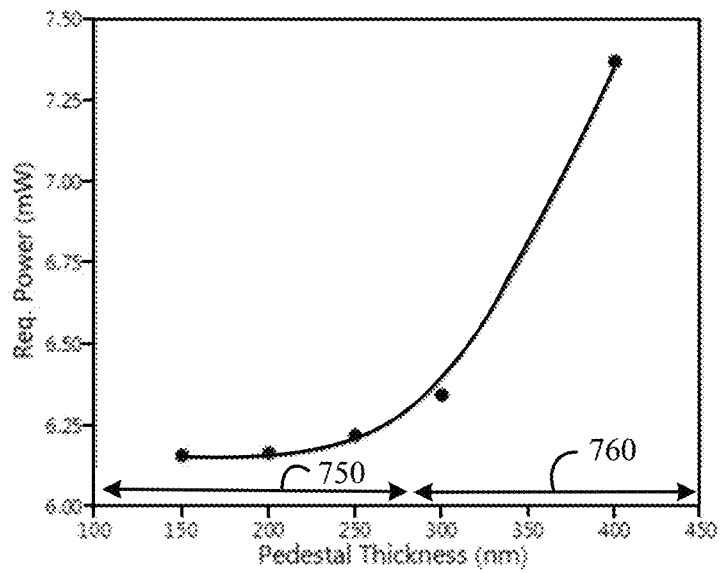

FIGS. 7A-7D illustrate various performance data associated with the thermal sensor configurations described herein. For FIGS. 7A-7D, $R_1$ is about 625 nm, and $R_2$ is about 1225 nm. FIG. 7A is a graph showing the maximum head temperature versus the pedestal thickness. In general, it may be desirable to choose a pedestal thickness within the range indicated by 710. For example, the pedestal thickness may be chosen in a range of about 150 nm to about 275 nm. FIG. 7B illustrates the thermal gradient versus the pedestal thickness. In general, it is desirable to have a maximum thermal gradient while balancing other parameters of the system such as the maximum head temperature and the laser power. Again, the pedestal thickness is chosen to be in the range indicated by 730. FIG. 7C shows the laser power versus the pedestal thickness. In the pedestal thickness range indicated by 750, the laser power does not change much. Therefore, there is not a large amount of additional power needed for the stated range of pedestal thicknesses.

Figure 7D:
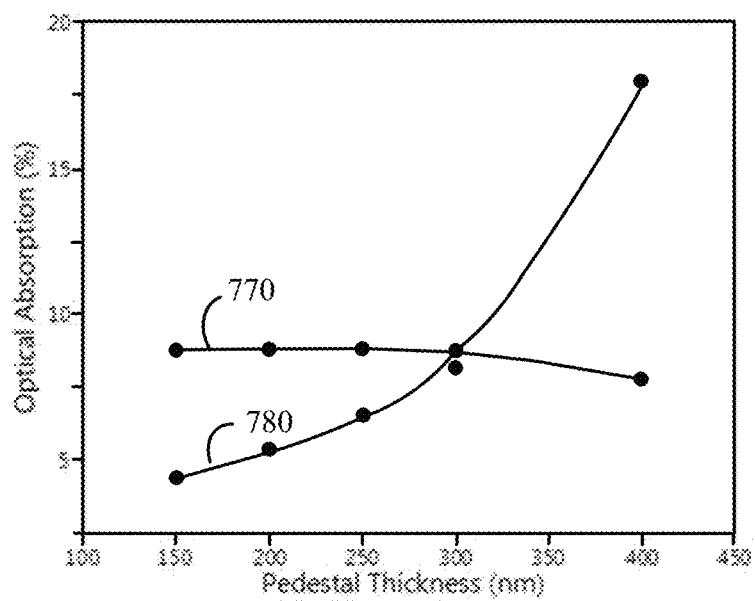

FIG. 7D shows the percentage of optical absorption versus the pedestal thickness for the thermal sensor 780 and the BCD 770. As can be observed, the optical absorption increases as the pedestal thickness increases. For larger pedestal thicknesses, the thermal sensor is disposed closer to the waveguide and the NFT. The optical absorption decreases of the BCD decreases slightly with a greater pedestal thickness.

Figure 8:
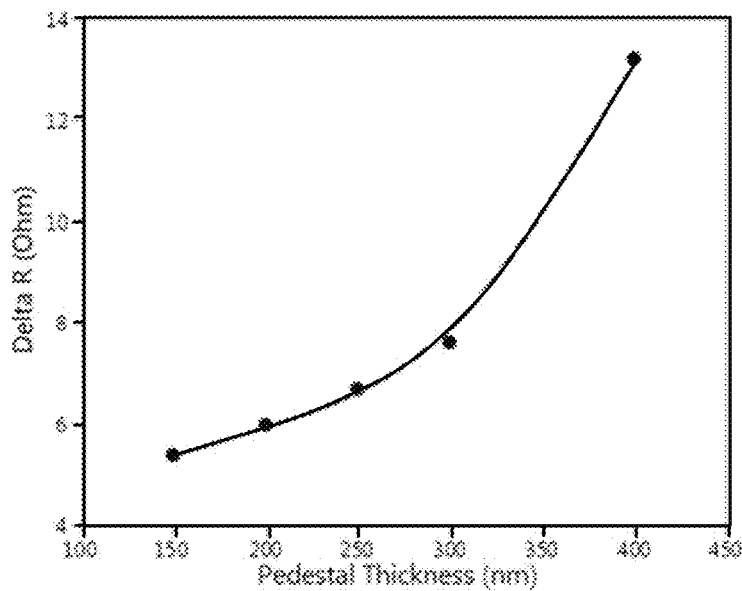
FIG. 8 illustrates the change in the resistance versus the pedestal thickness in accordance with embodiments described herein.
Figure 9:
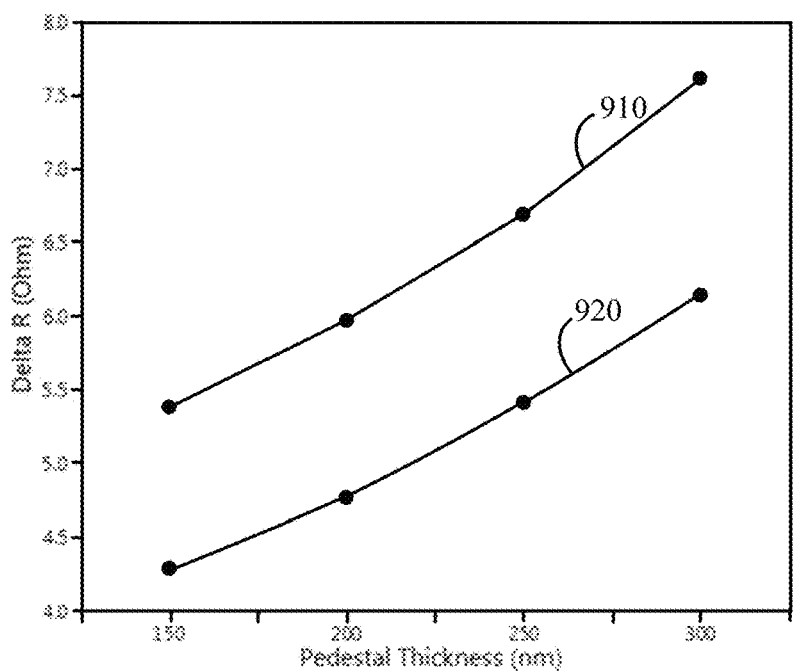
FIG. 9 shows the change in the resistance versus the pedestal thickness for a heatsinked BCD and an BCD that is not heatsinked.

FIG. 8 illustrates the change in the resistance versus the pedestal thickness in accordance with embodiments described herein. Similar to the optical absorption, the change in resistance increases as the thickness of the pedestal increases. The pedestal thickness is balanced with the other parameters of the system. FIG. 9 shows the change in the resistance versus the pedestal thickness for a heatsinked BCD 920 versus a BCD that is not heatsinked 910. There is a greater change in resistance for the BCD that is not heatsinked 910 because the BCD gets hotter.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus, comprising:
   a slider comprising an air bearing surface (ABS);
   a near-field transducer (NFT) at or near the ABS;
   an optical waveguide configured to couple light from a laser source to the NFT comprising a first side facing the NFT and a second opposing side facing away from the NFT, and further comprising an upper cladding layer, a lower cladding layer disposed proximate the second side, and a core disposed between the first and second cladding layers; and
   a thermal sensor disposed at a leading edge of the NFT within the lower cladding layer, the thermal sensor comprising an ABS section situated at or proximate the ABS and a distal section extending away from the ABS, the thermal sensor configured to detect changes in output optical power of the laser source and contact between the slider and a magnetic recording medium.

2. The apparatus of claim 1, wherein:
   the ABS section comprises a first section and a second section spaced apart from the first section in a cross-track direction; and
   the distal section has a first end connected to the first section and a second end connected to the second section.

3. The apparatus of claim 2, further comprising a structural element at or near the air bearing surface, the structural element disposed between the first section and the second section such that the distal portion of the thermal sensor is configured to at least partially wrap around the structural element.

4. The apparatus of claim 3, wherein the structural element comprises a metallic optical element.

5. The apparatus of claim 4, wherein the metallic optical element comprises a reflective surface configured to reflect stray light in a direction of the NFT.

6. The apparatus of claim 4, wherein the metallic optical element is configured to shape the light coupled to the NFT.

7. The apparatus of claim 1, wherein the distal section of the thermal sensor is a bolometer.

8. The apparatus of claim 1, wherein at least the distal section of the thermal sensor is situated to receive at least some of the light coupled to the optical waveguide.

9. The apparatus of claim 1, wherein the thermal sensor comprises a metal wire having a thermal coefficient of resistance.

10. The apparatus of claim 1, wherein the thermal sensor is spaced apart from the ABS in a range of about 100 nm to about 300 nm.

11. The apparatus of claim 1, wherein the optical waveguide is disposed between the NFT and the thermal sensor.

12. An apparatus, comprising:
a slider comprising an air bearing surface (ABS);
a write pole comprising a write pole tip at the ABS;
a near-field transducer (NFT) at or near the ABS adjacent the write pole;
an optical waveguide configured to couple light from a laser source to the NFT;
a thermal sensor disposed at a leading edge of the NFT, the thermal sensor comprising an ABS section and a distal section;
the ABS section comprising a first ABS section spaced apart from a second ABS section in a cross-track direction; and
the distal section extending away from the ABS and connected to the first and second ABS sections; and
a structural element at or near the air bearing surface, the structural element disposed between the first ABS section and the second ABS section such that the distal portion of the thermal sensor is configured to at least partially wrap around the structural element.

13. The apparatus of claim 12, wherein the first and second ABS sections extend along the ABS in a cross-track direction.

14. The apparatus of claim 12, wherein the thermal sensor is orientated along a plane substantially perpendicular to a plane of the ABS.

15. The apparatus of claim 12, wherein the structural element comprises a metallic optical element configured to reflect stray light in a direction of the NFT.

16. The apparatus of claim 12, wherein the optical waveguide is disposed between the NFT and the thermal sensor.

17. The apparatus of claim 12, wherein at least the distal section of the thermal sensor is situated to receive at least some of the light coupled to the optical waveguide.

18. The apparatus of claim 15, wherein the metallic optical element is configured to shape the light coupled to the NFT.

19. The apparatus of claim 12, wherein the thermal sensor comprises a metal wire having a thermal coefficient of resistance.

20. The apparatus of claim 12, wherein the thermal sensor is spaced apart from the ABS in a range of about 100 nm to about 300 nm.

* * * * *